May 9, 1967 I. J. BURNS 3,318,617
COMBINED VEHICLE BUMPER AND TRAILER HITCH
Filed June 7, 1965
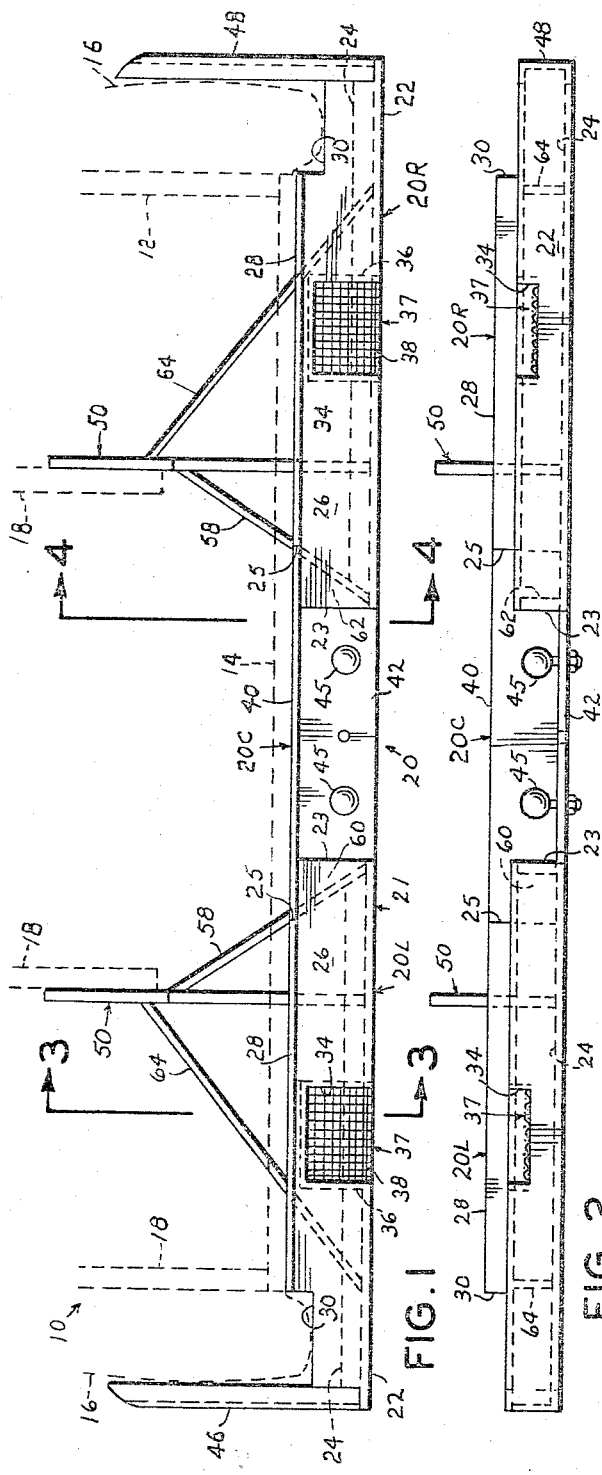
IRA J. BURNS
*INVENTOR.*
BY
*Robert K. Rhea*
AGENT

United States Patent Office 3,318,617
Patented May 9, 1967

3,318,617
COMBINED VEHICLE BUMPER AND
TRAILER HITCH
Ira J. Burns, 1500 SW. 82nd, Oklahoma City,
Okla. 73159
Filed June 7, 1965, Ser. No. 461,954
1 Claim. (Cl. 280—500)

The present invention relates to bumpers for trucks or other vehicles and more particularly to an improved bumper and trailer hitch for pick-up trucks.

The prior art reveals a number of bumpers of this class, the most of which rely, for rigidity, on the mass or cross-sectional area of the bumper to resist impact or strain thereon rather than a re-inforcing accomplished by the cross-sectional configuration of the bumper and the manner in which it is braced and connected with the frame of the vehicle. Furthermore, bumpers of this class, shown by the prior art, are preferably formed by a single primary member extending transversely of the vehicle and are, therefore, bulky in storage and not easily transported to a place of assembly for connection to a vehicle.

It is, therefore, the principal object of the present invention to provide a bumper of this class which is essentially composed of three separate sections which are integrally joined in longitudinal aligned relation to transversely span the rear end portion of a pick-up truck.

Another important object is to provide a combination re-inforced bumper and trailer hitch for the rear end of a pick-up truck, or the like.

Another object is to provide a support means for connecting the bumper to a vehicle chassis wherein brace members extend angularly between the bumper and support means for transferring any shock or force applied to the bumper to the vehicle frame.

Still another object is to provide a bumper of this class which features a recessed step for ease in entering the rear end of a pick-up truck.

A still further object is to provide a re-inforced bumper wherein structural members provide a protected recess for housing a license plate light and trailer brake or light outlet.

The present invention accomplishes these and other objects by integrally joining a plurality of bumper forming sections in longitudinally aligned relation. Interconnected support and brace members extend between the bumper and the vehicle chassis for connecting and re-inforcing the bumper.

Other objects will be apparent from the following description when taken in conjunction with the accompanying single sheet of drawings, wherein:

FIGURE 1 is a top plan view of the bumper illustrating, by dotted lines, its relation to the rear end of a pick-up truck;

FIGURE 2 is a rear elevational view of the bumper, per se;

FIGURES 3 and 4 are vertical cross-sectional views taken substantially along the lines 3—3 and 4—4 of FIG. 1;

FIGURE 5 is a perspective view, to a smaller scale, of one end section of the bumper and illustrating by dotted lines its relation to a fragment of the bumper center section when connected thereto; and, FIGURE 6 is a perspective view, on a similar scale, of the bumper center section, per se.

Like characters of reference designate like parts in those figures of the drawings in which they occur.

In the drawings:

The reference numeral 10 indicates, as a whole, a fragmentary rear end portion of a vehicle such as a pick-up truck, or the like, having a bed thereon defined by side walls 12 and a drop-type tail gate 14. Fenders 16 project outwardly of the respective sides 12. The pick-up further includes rearwardly projecting spaced-apart parallel chassis or frame members 18 positioned below the floor forming the pick-up bed.

The above description is conventional and describes the type of truck to which the invention is designed to be attached.

The reference numeral 20 indicates the bumper, as a whole, having a length which is at least equal to the width of the truck to which the bumper is to be attached so that the bumper may extend completely across and rearwardly of the rearward end of the truck 10. The bumper 20 is composed of left and right end members, as viewed in FIGS. 1 and 2 and indicated at 20L and 20R, respectively, integrally joined in longitudinal aligned relation to the respective ends of a center section 20C as more fully described in detail hereinbelow.

Since the bumper end sections 20L and 20R are mirror images of each other only the end section 20L will be described in detail to avoid repetition.

As shown in FIG. 3, the left section 20L is formed to defined a channel-like or U-shaped member 21 having a bight portion 22 facing rearwardly of the truck 10 and having a lower leg portion 24 transversely projecting horizontally forward from the bight portion 22. The other leg 26, of the U-shaped member 21, transversely projects horizontally forward from the bight portion 22 a distance substantially double the transverse width of the lower leg 24 where it is turned upwardly to form a flange 28. The end surface 23 of the leg 26 and bight portion 22, adjacent the center section 20C, is normal to the longitudinal axis of the member 21. The end portion of the leg 24, adjacent the end surface 23, is cut off on an angle, as at 27 (FIG. 5), for abutting a cooperating angularly cut-off end surface of the bumper center section 20C as will presently be described.

The end portion of the flange 28, adjacent the center section 20C, is cut off or terminated in spaced relation with respect to the leg end surface 23, as at 25 (FIG. 5). Adjacent its other or outermost end the flange 28 and a portion of the leg 26 are recessed or cut away, as at 30, to form a recess for nesting the rearwardly disposed portion of the vehicle fender 16. Intermediate its ends the leg portion 26 has a rectangular recess 34 cut therethrough which extends downwardly a short distance into the bight portion 22. The walls defining the recess 34 are bent downwardly to form flanged edges 36 and define a step 37. A section of expanded metal 38 extends horizontally across the recess or opening 34 and is welded to the depending edges of the recess flanges 36.

The center or trailer hitch section 20C is formed from an L-shaped member having a leg portion 40 and a foot portion 42. The vertical height of the leg portion 40 is equal to the distance between the leg 24 and the upper edge surface of the flange 28 of the end member 20L. The foot portion 42 of the L-shaped center member 20C extends horizontally rearward a distance equal to the width of the leg member 26 of the end member 20L. A portion of the respective ends of the vertically disposed leg portion 40 respectively abut the inwardly disposed edges of the upstanding flanges 28 of the end members 20L and 20R, as at 25. The leg member 40 also abuts the adjacent edge surface of the leg 26 of the end members. The transverse width of the foot portion 42 is preferably as great as the transverse width of the end member 20L and is provided with opposing angular end edge surfaces 43 (FIG. 6) which converge rearwardly of the vehicle and leg member and, respectively, abut the angular end edge surface 27 of the leg portions 24.

Wrap-around members 46 and 48 are welded to the respective outwardly disposed end portions of the members 20L and 20R. The wrap-around members 46 and 48 are preferably formed from channel-shaped steel having its bight portion transversely equal with respect to the end members bight portion 22 and disposed outwardly of the vehicle. The wrap-around members 46 and 48 extend forwardly from the respective member 20L and 20R along the respective fender 16 to protect the latter against damage. The central portion of the rearwardly disposed surface of the leg member 40 supports a license plate, not shown. The central portion of the foot portion 42 is drilled for receiving trailer hitch balls 45, or the like.

A pair of Z-shaped, when viewed in side elevation (FIGS. 3 and 4) connectors 50 are connected by one leg portion 52 within the respective end member 20L and 20R in spaced-apart relation so that the other leg member 54 of the Z-shaped connector projects forwardly and upwardly from the bumper 20 toward the vehicle chassis for connection with the respective frame member 18. Each of the connectors 50 have a pair of spaced-apart elongated apertures or slots 56 formed in its leg member 54 for receiving bolts and nuts, not shown, for connection with the frame members 18.

Inner braces 58 are connected at one end to the inwardly disposed surface of the respective Z-shaped connector adjacent its connection with the frame member 18 and extend angularly rearward of the truck in converging relation on an angle coinciding with the angle of the end surface 43 of the foot member 42. The other end of the respective brace member 58 abuts the inner surface of the bight portion 22 of the members 20L and 20R. Thus, the brace members 58, in combination with the leg 40 of the center member 20C and the adjacent overhanging end portion of the respective leg 26 of the end members 20L and 20R, form a pair of opposing sockets or recesses 60 and 62. The purpose of the recesses 60 and 62 is to permit positioning a trailer license plate socket and lamp 63 in one of the recesses and a trailer brake or light socket or connector plug, not shown, in the other recess. This protects the trailer license plate lamp and connector plug from damage and yet permits access to each of them.

Outer braces 64 are connected respectively at one end to the respective Z-shaped connector, opposite its attachment to the frame members 18, and extend angularly rearward of the truck in diverging relation and are connected at their other ends to the inner surface of the respective bight portion 22 of the end members 20L and 20R adjacent but spaced from the respective outwardly disposed ends thereof.

OPERATION

In operation the bumper sections 20L, 20R and 20C, as well as the wrap-around end members 46 and 48, the connectors 50 and braces 58 and 64, are each formed as separate units which simplifies their handling and storage. When one of the bumpers 20 is to be connected with a truck 10 the respective units or sections are assembled as described hereinabove and then connected to the truck frame members 18. The rearwardly converging angular position of the inner braces 58 transmit any shock or force applied to the rearward surface of the bumper or trailer hitch portion directly to the respective connectors 50 and to the truck frame members 18 thus resulting in a more rigid construction for the bumper 20 than is achieved by most bumpers of this type presently available.

Obviously the invention is susceptible to some change or alteration without defeating its practicability, and I therefore do not wish to be confined to the preferred embodiment shown in the drawings and described herein, further than I am limited by the scope of the appended claim.

I claim:

A bumper and trailer hitch for a pick-up truck, or the like, comprising: a pair of channel-shaped end members having horizontally disposed leg portions projecting toward the truck and each having an upstanding flange integral with the upper leg portion; an L-shaped trailer hitch center section having its leg portion vertically disposed and connected with the upstanding flange and upper leg portion of each said leg member and having its foot portion disposed horizontally and connected to the lower leg of each said end member; a channel-shaper wrap-around member connected to the respective free end of said end members; a pair of Z-shaped connectors connected with said end members in parallel spaced relation and extending laterally of said end members for connection with the truck; a pair of inner braces connected respectively to said pair of said Z-shaped connectors and extending in converging relation, toward and connected with said end members at the juncture of the respective adjacent ends of said end members and the respective ends of said L-shaped center member, said inner braces forming, in combination with the upper leg portion of each said end member, a pair of opposing recesses open toward the center of the bumper; lamp means mounted on said center section within the respective recess; and a pair of outer braces extending between and connected with the respective said Z-shaped connector and said end members intermediate their ends.

References Cited by the Examiner

UNITED STATES PATENTS

| | | | |
|---|---|---|---|
| 1,579,621 | 4/1926 | Kleven | 293—83 |
| 2,492,914 | 12/1949 | Barden | 280—500 |
| 2,707,650 | 5/1955 | Lawton | 280—500 X |
| 3,137,516 | 6/1964 | Cline | 293—69 X |

MILTON BUCHLER, *Primary Examiner.*

BENJAMIN HERSH, *Examiner.*

C. C. PARSONS, *Assistant Examiner.*